Dec. 15, 1959  N. L. SPOTTISWOODE ET AL  2,916,962
OPTICAL SYSTEMS FOR STEREOSCOPIC CAMERAS
Filed May 24, 1954

Inventor
Nigel L. Spottiswoode
Raymond J. Spottiswoode
By
Holcombe, Wetherill & Brisebois
Attorney

United States Patent Office 2,916,962
Patented Dec. 15, 1959

2,916,962

OPTICAL SYSTEMS FOR STEREOSCOPIC CAMERAS

Nigel Lawrence Spottiswoode and Raymond John Spottiswoode, London, England, assignors to National Research Development Corporation, London, England, a British corporation Application May 24, 1954, Serial No. 431,934

Claims priority, application Great Britain May 29, 1953

5 Claims. (Cl. 88—16.6)

The fundamental principle of the stereoscopic camera is to record a scene from two or more laterally displaced viewpoints corresponding to but not necessarily equal to any separation of the distance between the human eyes. Experience has shown that for some purposes, particularly for reproducing stereoscopic motion picture films on a large screen, the interocular separation of the camera lenses must be reduced to a low value, almost to zero, if the image is not to be brought uncomfortably close to the observer's eyes and if the proportions of the objects are to remain unimpaired.

The physical size of the two camera objectives makes it impossible, if the lenses are arranged side by side, to reduce the interocular spacing to the required extent, and it has already been proposed in United States specification 2,630,737 to overcome this difficulty by arranging the two cameras at right angles to one another with a semi-reflecting mirror arranged vertically therebetween so as to bisect the angle between the two camera objectives. One of the two cameras is adjustable horizontally so that the effective interocular distance between the two viewpoints may be adjusted from zero to any desired value. However, as the adjustable camera is moved to increase the interocular spacing, its objective moves further away from the semi-reflecting mirror which is inclined to its path of movement and therefore the bundle of rays which the mirror must accept becomes larger and larger. Consequently the mirror length becomes very great and the mirror depth also increases, and the mirror is generally made of trapezoidal shape. Since the mirror is fragile and it is difficult to prepare uniform semi-reflecting mirrors of large area and also to protect them from tarnishing, the arrangement has practical inconveniences as well as leading to bulky camera design.

The present invention has for its object to provide an improved optical system for stereoscopic cameras employing the fundamental principles as above described for enabling the interocular distance to be reduced to low values, wherein the semi-reflecting mirror is inclined to the horizontal plane, one camera being arranged behind the mirror and receiving light passing therethrough and the second camera receiving light reflected, either upwardly or downwardly, from the front of the mirror, at least one of the cameras being adjustable along a path which is substantially parallel to the horizontal axis of the mirror. In this specification the expression "horizontal axis of the mirror" means that horizontal line extending in the plane of the mirror which passes through the optical axis of the light rays passing through the mirror and into the objective of the camera arranged therebehind. With the arrangement described the said horizontal axis is perpendicular to the optical axis of the light rays, and by reason of the path of camera movement for adjusting the interocular distance being parallel to this horizontal axis, the objective of the adjustable camera remains at all times equidistant from the mirror and consequently the mirror can be of uniform depth and of less length than the mirror in the previously proposed arrangement. The mirror dimensions are further reduced by reason of the fact that the picture height is normally less than the picture width.

The camera receiving light reflected from the front of the mirror is arranged either above or below the camera which receives light passing through the mirror, depending upon whether the mirror is inclined backwardly or forwardly. The inclination of the mirror is arranged to bisect the angle between the paths of the light rays from the mirror to the two camera objectives, and for convenience may be arranged at 45° to the horizontal plane. In this case one camera is arranged with its objective horizontal directly behind the horizontal axis of the mirror and the other camera may be arranged with its objective extending vertically above or vertically below the horizontal axis of the mirror. Either one or both of the cameras may be mounted for movement in guides in horizontal paths parallel to the said horizontal axis of the mirror. If only one camera is adjustable, this may conveniently be the camera which is arranged behind the mirror.

Figure 1:
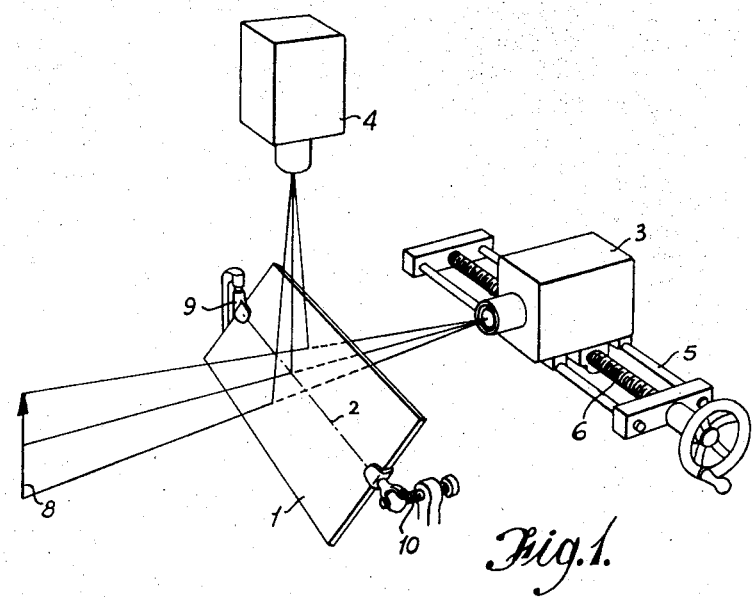
Fig. 1 is a perspective view of one embodiment according to the invention.

Referring to Fig. 1, 1 is the semi-reflecting mirror which is inclined at 45° to the horizontal plane, the horizontal axis 2 of the mirror being perpendicular to the optical axis of the light rays arriving from the scene 8 to be photographed. A proportion of these light rays pass through the semi-reflecting mirror 1 and are received by the objective of the camera 3, and another part of the light rays are reflected from the front surface of the mirror into the objective of the camera 4 arranged above the mirror with the axis of its objective extending vertically. The camera 3 is adjustable horizontally in guides 5 extending parallel to the horizontal axis 2. Adjustment may be effected by any suitable means, for example by the screw 6.

Figure 2:
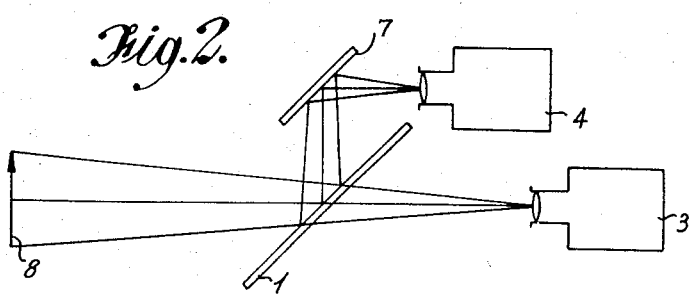
Fig. 2 is a side view of a modification.

By reason of image reversal at the reflecting surface, the image recorded in the camera 4 will be reversed, in one direction only, with respect to the image recorded in the camera 3. In order to overcome the practical inconveniences of copying the reversed film, according to a feature of the invention, the light rays passing to the camera 4 are submitted to a second reversal in the same plane but in the opposite direction to the reversal occurring by reflection at the surface of the mirror 1. This may be effected, as shown in Figure 2, by providing a totally reflecting mirror 7 in the path of the light rays between the mirror 1 and the objective of the camera 4, the camera 4 in this case being arranged horizontally. The length of the path of the light rays from the objective of the camera 4 to the horizontal axis of the mirror 1 should be the same as the path of the light rays from the objective of the camera 3 to this horizontal axis.

Whilst particular embodiments have been described, it will be understood that various modifications may be made without departing from the scope of the invention. For example, the mirror may also be mounted for adjustment about a vertical axis through a convenient point in the mirror, preferably at or adjacent one end thereof (as shown at 9 in Fig. 1), whereby, by turning the mirror slightly about this axis, the optical axes of the two cones of light rays arriving from the scene and entering the camera objectives respectively will no longer be parallel. In this way the two cones of light rays may be given a mutual convergence which is desirable for stereoscopic reproduction. The adjustment of the mirror about the vertical axis 9 may be effected by a fine pitch screw 10 or other means to adapt the convergence for the filming of any particular scene.

The two cameras may be mounted in a common housing or casing by which the mirror may also be carried.

We claim:

1. An optical system for stereoscopic cameras comprising a semi-reflecting mirror inclined to the horizontal plane, a first camera having an objective arranged behind the mirror and with the axis of its objective substantially perpendicular to the horizontal axis of the mirror so as to receive light from the scene which passes through the mirror, a second camera having an objective arranged with its axis substantially perpendicular to the horizontal axis of the mirror and also arranged to receive light from the same scene after reflection from the front surface of the mirror, and means for translationally moving at least one of the cameras along a path which is substantially parallel to the horizontal axis of the mirror and over a distance at least equal to the interocular separation between the human eyes.

2. An optical system for stereoscopic cameras comprising a semi-reflecting mirror inclined at an angle of approximately 45° to the horizontal plane, a first camera having an objective arranged with its axis substantially horizontally and substantially perpendicular to the horizontal axis of the mirror and viewing the scene to be photographed through the mirror, a second camera having an objective arranged with its axis extending substantially vertically and substantially perpendicular to the horizontal axis of the mirror and viewing the same scene to be photographed by reflection in the front surface of the mirror, and means for translationally moving at least one of the cameras along a path which is substantially parallel to the horizontal axis of the mirror and over a distance at least equal to the interocular separation between the human eyes.

3. System as claimed in claim 2, including also means supporting said mirror for movement about a vertical axis and means for adjusting the positon of the mirror about said vertical axis and for holding the mirror in the adjusted position.

4. An optical system for stereoscopic cameras comprising a first semi-reflecting mirror inclined at an angle of approximately 45° to the horizontal plane, a first camera having an objective arranged with its axis substantially horizontally and substantially perpendicular to the horizontal axis of said first mirror and viewing the scene to be photographed through the mirror, a second mirror inclined at approximately 45° to the horizontal plane with its horizontal axis substantially parallel to the horizontal axis of the first mirror and displaced vertically with respect thereto to receive and reflect light from the same scene to be photographed, after it has been reflected at the front surface of said first mirror, a second camera having an objective arranged with its axis substantially horizontal and substantially perpendicular to the horizontal axis of said second mirror, and means for adjusting at least one of the cameras along a path which is substantially parallel to the horizontal axes of the mirrors and over a distance at least equal to the interocular separation between the human eyes.

5. System as claimed in claim 4, including also means supporting said first mirror for movement about a vertical axis and means for adjusting the position of said first mirror about said vertical axis and for holding said first mirror in the adjusted position.

References Cited in the file of this patent

UNITED STATES PATENTS

| 852,476 | Verbeck | May 7, 1907 |
| 1,461,133 | Marten | July 10, 1923 |
| 1,488,027 | Runcie | Mar. 25, 1924 |
| 1,818,354 | Pomeroy | Aug. 11, 1931 |
| 2,053,224 | Reason | Sept. 1, 1936 |
| 2,056,600 | Crosier | Oct. 6, 1936 |
| 2,153,892 | Jackman | Apr. 11, 1939 |
| 2,630,737 | Ramsdell | Mar. 10, 1953 |

FOREIGN PATENTS

| 613,749 | France | Nov. 27, 1926 |
| 473,766 | Great Britain | Oct. 20, 1937 |